US007470444B2

(12) United States Patent
McKinzie et al.

(10) Patent No.: US 7,470,444 B2
(45) Date of Patent: Dec. 30, 2008

(54) TRIPE-BLEACHING COMPOSITION

(75) Inventors: Michael D. McKinzie, Kansas City, MO (US); Alan R. Monken, Overland Park, KS (US)

(73) Assignee: DeLaval, Inc., Kansas City, MO (US)

( * ) Notice: Subject to any disclaimer, the term of this patent is extended or adjusted under 35 U.S.C. 154(b) by 456 days.

(21) Appl. No.: 11/413,464

(22) Filed: Apr. 28, 2006

(65) Prior Publication Data

US 2007/0254823 A1 Nov. 1, 2007

(51) Int. Cl.
*A22C 17/16* (2006.01)

(52) U.S. Cl. ........................ 426/539; 426/258; 426/261; 252/186.28

(58) Field of Classification Search ........................ None
See application file for complete search history.

(56) References Cited

U.S. PATENT DOCUMENTS

| | | | |
|---|---|---|---|
| 2,673,804 | A | 3/1954 | Paddock |
| 3,025,166 | A | 3/1962 | Smith |
| 3,475,179 | A | 10/1969 | Smith |
| 5,744,439 | A | 4/1998 | Bonett |
| 6,348,226 | B1 | 2/2002 | McAninch et al. |

FOREIGN PATENT DOCUMENTS

| | | |
|---|---|---|
| EP | 845526 A2 | 3/1998 |
| WO | WO 91/08981 | 6/1991 |
| WO | WO 98/21305 | 5/1998 |

*Primary Examiner*—Gregory R Del Cotto
(74) *Attorney, Agent, or Firm*—Lathrop & Gage LC

(57) ABSTRACT

An improved composition for bleaching and washing animal tissue is disclosed. More particularly, organic acids and surfactants are employed along with hydrogen peroxide to achieve higher washing and bleaching efficiency on tripe and other animal tissue. This higher efficiency also results in higher overall yields of the bleached product.

9 Claims, No Drawings

TRIPE-BLEACHING COMPOSITION

BACKGROUND

1. Field of the Invention

The present invention relates to an improved composition for treatment of animal tissue. More particularly, the composition and method disclosed provide more efficient washing and bleaching of the tripe and higher overall yield. The composition may also be used for other treatments, such as carcass washing of swine, beef or poultry.

2. Description of the Related Art

Processing of edible tissue, such as tripe, into consumable products is an important component of the meat industry. Although the details of the process varies among different facilities, the basic steps for tripe cleaning and bleaching remain essentially the same. First, the tripe is washed and scalded for about 6 to 10 minutes in water. The washed tripe is then transferred to an apparatus called the refiner where the tripe is further washed and bleached by detergents and bleaching agents.

A number of compositions have been described as tripe bleaching agents. U.S. Pat. No. 2,673,804 describes the use of a solution containing hydrogen peroxide and acetic acid to wash and bleach tripe. U.S. Pat. No. 3,025,166 discloses an improved bleaching agent containing sodium carbonate peroxide at a pH range from 7.5 to 10. More recently, European Patent Application EP 845526 discloses a composition for cleaning hard surfaces. The composition contains hydrogen peroxide, citric acid and a surfactant. U.S. Pat. No. 6,348,226 issued to McAninch et al. describes a method for bleaching tripe by combining hydrogen peroxide with carboxylic acids, such as tartaric acid and malic acid. The inclusion of carboxylic acid appears to increase the efficiency of the tripe cleaning; however, McAninch et al. uses only selected acids and teaches against the use of certain carboxylic acids, such as citric acid.

The different bleaching agents developed over the years have various shortcomings when used to wash and bleach tripe. Although hydrogen peroxide is a good bleaching agent, it does not act as a detergent and therefore does not clean the tripe well. Moreover, because of its high polarity, hydrogen peroxide does not form good contact with the tripe and therefore does not bleach the tripe efficiently. Although the composition disclosed in EP 845526 contains a surfactant that may help increase the contact between hydrogen peroxide and the surface to be cleaned, the low operating pH (at pH 1-4) of the composition is poorly suited for tripe cleaning.

Moreover, existing tripe bleaching methods result in reduced yield of the final product. The lower yield may be attributed to the long incubation time under existing methods that use mechanical agitation. A tension exists between complete bleaching and higher yields. Under-incubation in the refiner may result in insufficient bleaching of the tripe, which may have negative effect on the marketability of the product. On the other hand, over-incubation in the refiner may lead to low yield of the final product. Therefore, there is a need for a better bleaching composition that can clean and bleach the tripe within a shortened period of time.

SUMMARY

The present instrumentalities overcome the aforementioned problems and advance the art by providing an improved composition for cleaning and bleaching tripe efficiently with higher yield. The new composition contains hydrogen peroxide mixed with carboxylic acids and a surfactant. The inclusion of carboxylic acids, such as citric acid, was initially intended to help chelate any cations in hard water. Subsequent chemical analysis has shown that the carboxylic acid has been substantially converted to peracid which enhances the bleaching power of the composition by adding a more active peroxygen species to the solution. Although McAninch et al. in U.S. Pat. No. 6,348,226, teaches that the peracids derived from citric acid or lactic acid are highly unstable and should not be used, it has been discovered that this is not the case. Such ingredients may even be preferable, especially citric acid.

The addition of a surfactant may increase the contact between the bleaching solution and the tripe. Experiments have shown that the presence of carboxylic acids and surfactants do not have much negative effect on the stability of the hydrogen peroxide. In addition, the composition of the present disclosure may be prepared as a concentrate to be diluted before use.

According to the present disclosure, the bleaching composition may be mixed with an alkaline detergent to form a cleaning mixture in the refiner. The cleaning mixture usually has a pH value from about 8 to 14. After the washing step, the tripe may be transferred into the refiner where it is soaked in the cleaning mixture and stirred where, for example, effective cleaning may be achieved within about 8 to 10 minutes or less. The residence time for the tripe in the refiner is preferably minimized in order to maximize product yield, and may be controlled manually or automatically.

Broadly speaking, a composition of food-grade ingredients effective for bleaching tripe may be provided as hydrogen peroxide ranging from 0.06% to 50% by weight, an organic acid material having a carbon number ranging from 2 to 6 in an amount ranging from 0.004% to 5% by weight; and a surfactant ranging from 0.002% to 10% by weight. The organic acid material may be, for example, citric acid, tartaric acid, malic acid, maleic acid, lactic acid, acetic acid, and combinations thereof. Citric acid is most preferred. As this is a listing of ingredients, the ingredients may incur some reactions among themselves, for example, in the formation of a peracid moiety by the reaction between hydrogen peroxide and the organic acid.

Efficacy of the bleaching solution is enhanced by combining the same with an alkaline material in an effective amount to provide an alkaline pH, for example, from 8 to 14. This is preferably a pH from 10 to 13, and more preferably from 12 to 13. The alkaline material may be a metal hydroxide, such as potassium hydroxide and/or sodium hydroxide. The activity of the metal hydroxide may be enhanced by further inclusion of a corresponding metal silicate, such as potassium silicate and/or sodium silicate.

The bleaching solution may be provided as a concentrate for mixing with the alkaline material at the point of use. In one aspect, the concentrate may contain hydrogen peroxide ranging from 10% to 50% by weight, an organic acid material having a carbon number ranging from 2 to 6 in an amount ranging from 1% to 20% by weight, and a surfactant ranging from 0.5% to 30% by weight,. The foregoing ingredients should be food grade materials.

The term "food grade materials" is recognized in the art as designating materials that from a perspective of skill are suitable for human use. In the United States, the Food and Drug Administration (FDA) may define such standards by regulatory action that may take the form of regulations or guidelines. This may be supplemented by conventional industry practices where the standards for food grade materials are well known in the art. The term is widely used and understood, and it and has special significance from a perspective of ordinary skill in the art. Generally these materials are those which are not prohibited by regulation, expressly permitted by regulation, and are generally regarded as safe. Food grade materials conform to regulations affecting foods and food processing, and from a perspective of skill in the art conform with food industry safe practices to the extent that the materials are not subject to regulation. A number of countries have analogous agencies to the FDA, such as the European Food Safety Authority, that define the food grade quality standards for their particular jurisdictions. Such standards are generally compatible with those in the United States.

One method of bleaching tripe includes contacting tripe with the foregoing materials and agitating the tripe for a period of time that is sufficient for effective bleaching of the tripe. Generally, the materials may be heated to about 150° F. and allowed to cool as the bleaching proceeds.

DETAILED DESCRIPTION

A composition that contains hydrogen peroxide, organic acids, caustic and surfactants is shown to achieve high efficiency in tripe cleaning and bleaching. The relative percentages of different ingredients in the teaching below serves as a guidance. Slight variation may be tolerated without departing from the spirit of the invention. In one aspect, the composition may be provided as a two part mixture including an alkaline solution and a bleaching solution. The two solutions may be combined at the point of use to provide a working solution for the bleaching of tripe and other uses as disclosed herein. All ingredients for the composition should be of food grade quality.

Bleaching Solution

Hydrogen peroxide is preferably present in the bleaching solution at about 0.06% to 50% by weight to achieve efficient bleaching, and this is more preferably from 10% to 40%. The organic acids may be present at about 0.004% to 5% by weight of the total composition. This range of organic acid content is more preferably from 0.1% to 4%, and even more preferably from about 1% to 2%. It is possible to have more than one species of organic acid in the same composition, the two species being combined in the foregoing amounts. The surfactant is suitably present at about 0.002% to 10% by weight, and this is more preferably from 0.002% to 1%.

Hydrogen peroxide is a strong oxidizing agent and may react with other components in the composition. The data reported in Example 1 below indicates that although a small amount of citric acid may react with the hydrogen peroxide, a solution containing about 35% hydrogen peroxide and about 2% citric acid remains relatively stable as measured by the concentration of hydrogen peroxide over an extended period of time.

The organic acids may be any carboxylic acids that do not substantially destabilize the other ingredients of these solutions. The organic acid preferably contains from two to six carbon atoms. Examples of suitable carboxylic acids include citric acid, lactic acid, tartaric acid, malic acid, maleic acid, acetic acid, glycolic acid, oxalic acid, fumaric acid, succinic acid, and combinations of two or more such acids. Lactic acid and citric acid are preferred. Citric acid is most preferred because it is relatively inexpensive and its taste and smell are compatible with most food products.

The term "surfactant" refers to organic compounds that are amphipathic, which means that the same molecule contains both a hydrophobic and a hydrophilic group. The hydrophilic group is customarily called the "head" of the surfactant, while the hydrophobic group referred to as the "tail." By way of functional definition, a surfactant generally reduces the surface tension between two phases. A surfactant may be classified according to the presence or absence of a charged group in the head. A non-ionic surfactant has no charge group in its head, while the head of an ionic surfactant generally carries a net charge. A surfactant with a head that carries both a positively and a negatively charged group is termed a zwitterionic or amphoteric surfactant.

Suitable surfactants for the disclosed composition may be an ionic, a non-ionic or an amphoteric surfactant. A sulfonate based ionic surfactant or a non-ionic surfactant is preferred. One example of a sulfonate based surfactant includes but is not limited to sodium dodecylbenzene sulfonate (or DDBSA). Where many surfactants generate foam, a small amount of foam formation is acceptable for the present purpose.

The bleaching solution may be prepared as a concentrate that is to be diluted with the alkaline solution before use.

Alkaline Component or Solution

The alkaline solution is a food grade ingredient that when mixed with the bleaching solution is effective to raise the pH of the admixture into the range of from 8 to 14, more preferably from 10 to 13, and most preferably from 12 to 13. The alkaline agent includes water and preferably a metal hydroxide, such as potassium or sodium hydroxide. It is possible to add alkaline or caustic materials as solids directly to the bleaching solution for pH adjustment, or to premix the alkaline solution as a liquid solution. It will be appreciated, that one or more ingredients of the bleaching solution may also be present in the alkaline solution; however, point of use mixing is recommended because the alkaline agents may react with the hydrogen peroxide with evolution of gas.

Working Solution

The bleaching solution disclosed herein may contact the tripe separately from other compositions or in combination with other compositions. Preferably, the bleaching agent is combined with an alkaline detergent as an admixture. Such an admixture is typically prepared in the refiner. The admixture exerts its effect on the tripe as both a detergent and a bleaching agent. A mechanical stirring device may be employed in the refiner which may exert mechanical force on the tripe. These combined physical and chemical forces help achieve the best washing and bleaching results.

In order to act as an effective cleaning and bleaching agent, hydrogen peroxide may be present at a much lower concentration in a diluted form, which when mixed with the alkaline solution is referred to herein as the working solution. Table 1 shows suitably effective amounts of the various ingredients where "DDBSA" refers to sodium dodecylbenzene sulfonate. More generally, this may be any surfactant with nonionic and anionic surfactants being preferred and sulfonates being most preferred. As shown in Table 2, the stability of hydrogen peroxide is not substantially affected by the presence of 2% citric acid in the composition. Some other acids, such as 2% or 5% sodium acid pyrophosphate, are not suitable because they are not sufficiently soluble in concentrated hydrogen peroxide.

When the alkaline detergent is mixed with the disclosed bleaching agent, evolution of gas may be observed due to the reaction between the hydroxide in the alkaline detergent and the peroxide in the bleaching agent. Where the pH range of the alkaline solution described above is generally in the range of about 11 -13.5, the pH of the admixture is essentially unchanged from this value after the mixing. Table 1 summarizes effective ranges of ingredients for use in the working solution.

TABLE 1

| Final Concentration of Chemicals in the Working Solution Mixture | |
|---|---|
| Components | Concentration |
| NaOH or KOH | 0.2%-8% |
| Potassium silicate | 0.02%-0.75% |
| Hydrogen peroxide | 0.06%-30% |
| Citric acid | 0.004%-1.7% |
| Surfactant (DDBSA) | 0.002%-0.9% |

The examples herein illustrate the present invention by way of illustration, and not by limitation. The chemicals and other ingredients are presented as typical components or reactants, and various modification may be derived in view of the foregoing disclosure within the scope of the present disclosure.

EXAMPLE 1

Solution Stability Study

In view of the teaching in the prior art that mixtures of citric acid and hydrogen peroxide are unstable, a number of tests were performed to study the stability of citric acid and hydrogen peroxide solutions.

Table 2 reports the results of mixing 2% citric acid with 35% hydrogen peroxide in water. Two samples were prepared. One sample was stored at room temperature of approximately 20° C., and another was stored at 50° C. The hydrogen peroxide concentration was determined by chemical analysis at 0, 15, and 40 days.

TABLE 2

Effect of 2% Citric Acid on the Stability of 35% Hydrogen Peroxide in Water*

| Time | Room Temperature | 50° C. |
|---|---|---|
| Day 0 | 35% | 35% |
| Day 15 | 33.2% | 29.8% |
| Day 40 | 35.3% | 30.1% |

*Two additional stability studies were performed mixing 35% hydrogen peroxide with 2% sodium acid pyrophosphate or 5% sodium acid pyrophosphate, respectively. Both preparations separated immediately.

Another study quantitatively assessed the concentrations of percitric acid and hydrogen peroxide over time in an reaction mixture combining 2% citric acid and 35% hydrogen peroxide in water. Two samples were prepared. One sample was stored at room temperature and another at 90° C. Table 3 shows the results over a four week study interval

TABLE 3

Effect of 2% Citric Acid on the Stability of 35% Hydrogen Peroxide In Water

| | Room Temperature | | | Temp. 90° C. | | |
|---|---|---|---|---|---|---|
| Week | % Percitric Acid | % $H_2O_2$ | % Degradation $H_2O_2$ | % Percitric Acid | % $H_2O_2$ | % Degradation $H_2O_2$ |
| 0 | — | 34.8 | | — | 34.8 | |
| 1 | 2.6 | 34.1 | 2.0 | 2.5 | 33.7 | 3.2 |
| 2 | 1.9 | 33.8 | 2.9 | 2.1 | 33.2 | 4.8 |
| 3 | 2.0 | 33.5 | 3.8 | 2.1 | 32.8 | 6.1 |
| 4 | 2.1 | 33.2 | 4.8 | 2.0 | 32.4 | 7.4 |

EXAMPLE 2

Surfactant Stability Study

In like manner with respect to Example 1, a study was performed to assess the stability of various surfactants in 35% hydrogen peroxide. Table 4 shows that the presence of surfactant in the composition does not have a substantial effect on the stability of the hydrogen peroxide.

TABLE 4

Effect of Different Surfactants on the Stability of 35% Hydrogen Peroxide in Water

| | Surfactant | | | |
|---|---|---|---|---|
| Time | 1% DDBSA Room Temperature | 1% DDBSA 40° C. | 1% Dowfax 2A1 Room Temperature | 1% Dowfax 2A1 40° C. |
| Day 0 | 35% | 35% | 35% | 35% |
| Day 5 | 34.3% | 34.1% | 32.5% | 33.6% |
| Day 30 | NA | 29.2% | NA | 27.6% |

EXAMPLE 3

Tripe Bleaching Process and Different Cleaning Results with Different Bleaching Compositions A plurality of different formulations were prepared as described above and used in commercial process equipment to assess the utility of these formulations in a tripe washing/bleaching process. The process equipment included a conventional washer upstream of a conventional refiner. Mechanical agitation was provided in both the washer and the refiner by use of a bottom plate having ridges to assist stirring.

In each instance, seventeen pieces of tripe were placed in the washer. Water at a temperature of about 145° F. was injected continuously for 6 to 7 minutes with the drain open. Three wash loads were combined in the refiner. All chemicals were added to the refiner concurrently while hot water at a temperature of about 127° F. was being injected. Total volume of water added was about 55 gallons. After the addition of all chemicals, including about 80 ounces of the alkaline detergent solution and 30 ounces of the bleaching solution, the refiner was turned on with agitation for about 8.5 minutes. The refiner drain was opened to drain the chemicals and water, the tripe was rinsed and cooled with cold water.

Commercial food grade chemicals were purchased and mixed to form an alkaline detergent solution including 23.4% water, 33.3% NaOH, and 10% potassium silicate (w/w). In like manner, commercial food grade chemicals were purchased and mixed to form a bleaching solution including a 35% hydrogen peroxide in water.

Three runs were performed according to the above washing/bleaching procedure. The compositions used in the three runs and the cleaning results are detailed in Table 5. The test results indicate that addition of a surfactant combined with citric acid at a specified concentration provided the most improvement to the tripe cleaning process.

TABLE 5

Comparison of Different Cleaning Results Using Different Compositions

| Ingredient | Ounces |
|---|---|
| **Run No. 1** | |
| Alkaline detergent solution | 80 |
| Bleaching solution | 30 |
| Citric Acid | 12 |
| Result: Decent cleaning, some burning and yellowing of tripe. | |
| **Run No. 2** | |
| Alkaline detergent solution | 80 |
| Bleaching solution | 30 |
| Citric Acid | 0.6 |
| Result: No burning; significantly better cleaning than Run No. 1. | |
| **Run No. 3** | |
| Alkaline detergent solution | 70 |
| Bleaching solution | 30 |
| Citric Acid | 0.6 |
| Alka-Clean Additive 2000 ™ (available on commercial order from deLaval Cleaning Solutions of Kansas City, Missouri as an aqueous mixture of linear alcohol ethoxylate, carboxylated linear alcohol ethoxylate, and alkyletherhydroxypropylsultane.) | 4 |
| Result: No burning; best cleaning of the three runs, minimal foam. | |

EXAMPLE 4

New Bleaching Composition Shortens Processing Time

Processing time is an important factor in determining the overall yield of the cleaned tripe. The longer the tripe is in contact with the cleaning and bleaching agent, the lower the overall yield. In order to compare the processing time required for the old cleaning composition and the new improved composition of the present disclosure, a 5-gallon trial batch of mix containing 2% citric acid and 1% DDBSA and an old batch mix without the citric acid and DDBSA were used to clean 34 pieces of tripe that have been washed in the washer. The cleaning and bleaching results and the minimal processing time required to achieve a satisfactory result are compared and summarized in Table 6.

TABLE 6

Comparison of Different Compositions and the Required Processing Time

| Ingredients | Old Batch Mix Ratio | Trial Batch Mix Ratio |
|---|---|---|
| Alkaline detergent solution (see Example 3) | 10 oz | 10 oz |
| Bleaching solution (see Example 3) | 80 oz | 72.75 oz |
| Citric acid | 0 | 1.5 oz |
| DDBSA | 0 | 0.75 oz |
| Number of tripe pieces | 34 pieces | 34 pieces |
| Processing time in refiner | 10-12 minutes | 8-10 minutes |

Although both cleaning compositions showed minimal difference in dosage rate, the trial bleaching batch required significantly less processing time which helps reduce material loss in the process. Tripe was slightly heavier after being processed by the trial batch as compared to tripe processed by the old batch mix. This higher final product yield may at least be partially attributed to the shorter processing time when using the trial batch. The tripe showed strong nap and corn straw after being processed in the trial batch. Nap generally refers to the loose, coarse "pile-like" tissue located on the inner lining of the tripe. Corn straw is the fibrous outer layer of the tripe. The rinsing process is relatively easier with the trial batch than with the old batch mix because less visible saponification in the effluent was observed. No residual chemical was detectable by smell or touch in both processes.

In order to test the cleaning result when the new composition is used in industrial scale, a 265-gallon Experimental Tripe Bleach was prepared including 34% hydrogen peroxide, 2% citric acid and 1% DDBSA. This was used in combination with the alkaline detergent solution as in Example 4.

After charging the refiner with tripe, the chemicals are dosed simultaneously into the refiner without additional water. When the desired product appearance (proper level of "whiteness" as judged by the operator) had been achieved, the refiner was filled with cold water to cool the tripe and to rinse out the chemicals. Following a few minutes of mixing (after the water addition) the liquid was drained from the refiner and the tripe were removed for further processing and packaging.

In both the small-scale and large-scale trials, the process time was controlled manually based on the operator's judgment of whiteness. Although some variations might be inevitable due to different perception of whiteness by different operators, a reduction of about 2 minutes in processing time was consistently achieved using the composition of the present disclosure. The shortened processing time resulted in less erosion of nap and corn straw. Hence, the experimental tripe bleach disclosed herein provides increased profitability to the customer by increasing the overall product yield.

EXAMPLE 5

Mixture of the Bleaching Composition With an Alkaline Detergent for Use in Tripe Cleaning The Experimental Tripe Bleach may be mixed with other chemicals to achieve better cleaning results. In this example, an alkaline detergent solution (ADS) and the Experimental Tripe Bleach (a bleaching solution) were prepared separately as follows:

| | ADS | Experimental Tripe Bleach |
|---|---|---|
| Water | 23.4% | — |
| NaOH, 50% | 66.6% | — |
| Kasil #1, potassium Silicate | 10.0% | — |
| DDBSA | — | 1.0% |
| Citric acid, anhydrate | — | 2.0% |
| Hydrogen Peroxide, 35% in water | — | 97.0% |

Mixture 1 was prepared by mixing 10 mL of ADS with 30 mL of Experimental Tripe Bleach. The mixture erupted into a vigorous boil within 60 seconds. This boiling was due to reaction between the hydroxide and the peroxide resulting in decomposition of the peroxide with the liberation of oxygen gas. The boiling was not the result of the excessive evolution of heat. The sample pH was measured as 12-13.

An additional 30 mL of Experimental Tripe Bleach was added. Same response was observed. The pH was essentially unchanged.

When Mixture 2 was prepared by mixing 30 mL of ADS with 10 mL of Experimental Tripe Bleach, the reaction was slightly less vigorous than for Mixture 1 but the mixture still boiled. The pH of Mixture 2 measured as 13. When 1 L of tap water was added and mixed, the pH measured as 12-13. When 400 mL of water was added to 100 mL of Mixture 2, the pH was measured as 11-12.

What is claimed is:

1. A method for bleaching tripe comprising contacting said tripe with a composition that contains:

hydrogen peroxide ranging from 0.06% to 50% by weight, an organic acid material which is at least one member selected from the group consisting of citric acid, lactic acid, tartaric acid, malic acid, maleic acid, acetic acid, glycolic acid, oxalic acid, fumaric acid, and succinic acid in an amount ranging from 0.004% to 5% by weight, a surfactant ranging from 0.002% to 10% by weight, and an alkaline material in an effective amount to provide the composition with a pH ranging from 10 to 13; and agitating the tripe in contact with the composition for a period of time sufficient to bleach the tripe.

2. The method of claim 1 wherein the organic acid material includes citric acid.

3. The method of claim 1, wherein the pH ranges from 12 to 13.

4. The method of claim 1, wherein the alkaline material comprises a metal hydroxide.

5. The method of claim 4, wherein the metal hydroxide is selected from the group consisting of potassium hydroxide and sodium hydroxide.

6. The method of claim 1, wherein the alkaline material is provided as a solution that contains a metal hydroxide and a silicate in water.

7. The method of claim 6 wherein the silicate is selected from the group consisting of sodium silicate and potassium silicate.

8. The method of claim 1 wherein the contacting step commences at a temperature of at least 150° F.

9. The method of claim 1, wherein the surfactant used in the contacting step includes a sulfonate.

* * * * *